United States Patent [19]

Gross

[11] Patent Number: 4,897,230

[45] Date of Patent: Jan. 30, 1990

[54] METHOD OF AND APPARATUS FOR MEASURING AND CONTROLLING BLOW-UP OF A FOAM SHEET IN A THERMOFORMER OVEN

[75] Inventor: Jonathan Gross, Canandaigua, N.Y.

[73] Assignee: Mobil Oil Corp., New York, N.Y.

[21] Appl. No.: 232,148

[22] Filed: Aug. 15, 1988

Related U.S. Application Data

[63] Continuation-in-part of Ser. No. 223,981, Jul. 25, 1988.

[51] Int. Cl.$^4$ ............... B29C 51/42; B29C 51/46; B29C 67/20
[52] U.S. Cl. ............... 264/40.1; 264/40.6; 264/40.7; 264/321; 425/141; 425/143; 425/145
[58] Field of Search ............... 264/40.6, 40.1, 40.7, 264/280, 321; 425/141, 143, 145, 383

[56] References Cited

U.S. PATENT DOCUMENTS

| | | | |
|---|---|---|---|
| 4,376,085 | 3/1983 | Burry ............... | 264/40.4 |
| 4,382,761 | 5/1983 | Daubenbuchel et al. ..... | 264/40.1 X |
| 4,412,961 | 11/1983 | DiBiasi et al. ............... | 264/40.1 |
| 4,438,054 | 3/1984 | Holden ............... | 264/40.6 |
| 4,454,082 | 6/1984 | Cisar et al. ............... | 264/40.1 |
| 4,505,158 | 3/1985 | Maples ............... | 73/766 |
| 4,832,885 | 5/1989 | Gross ............... | 264/40.6 |

Primary Examiner—Jeffery Thurlow
Assistant Examiner—Leo B. Tentoni
Attorney, Agent, or Firm—Alexander J. McKillop; Charles J. Speciale

[57] ABSTRACT

A method and an apparatus for measuring and controlling foam sheet blow-up in a thermoformer oven. Control of the oven operation is achieved through monitoring the measured blow-up of a material in the thermoformer oven at a sensing location in a forming station receiving the material from the over in order to regulate the thickness of the plastic material prior to its conveyance into said forming station. This is effected by varying the rate of advance and dwelling time of the material in the oven, and optionally, also concurrently regulating the temperature in the oven to optimize control over material blow-up.

10 Claims, 1 Drawing Sheet

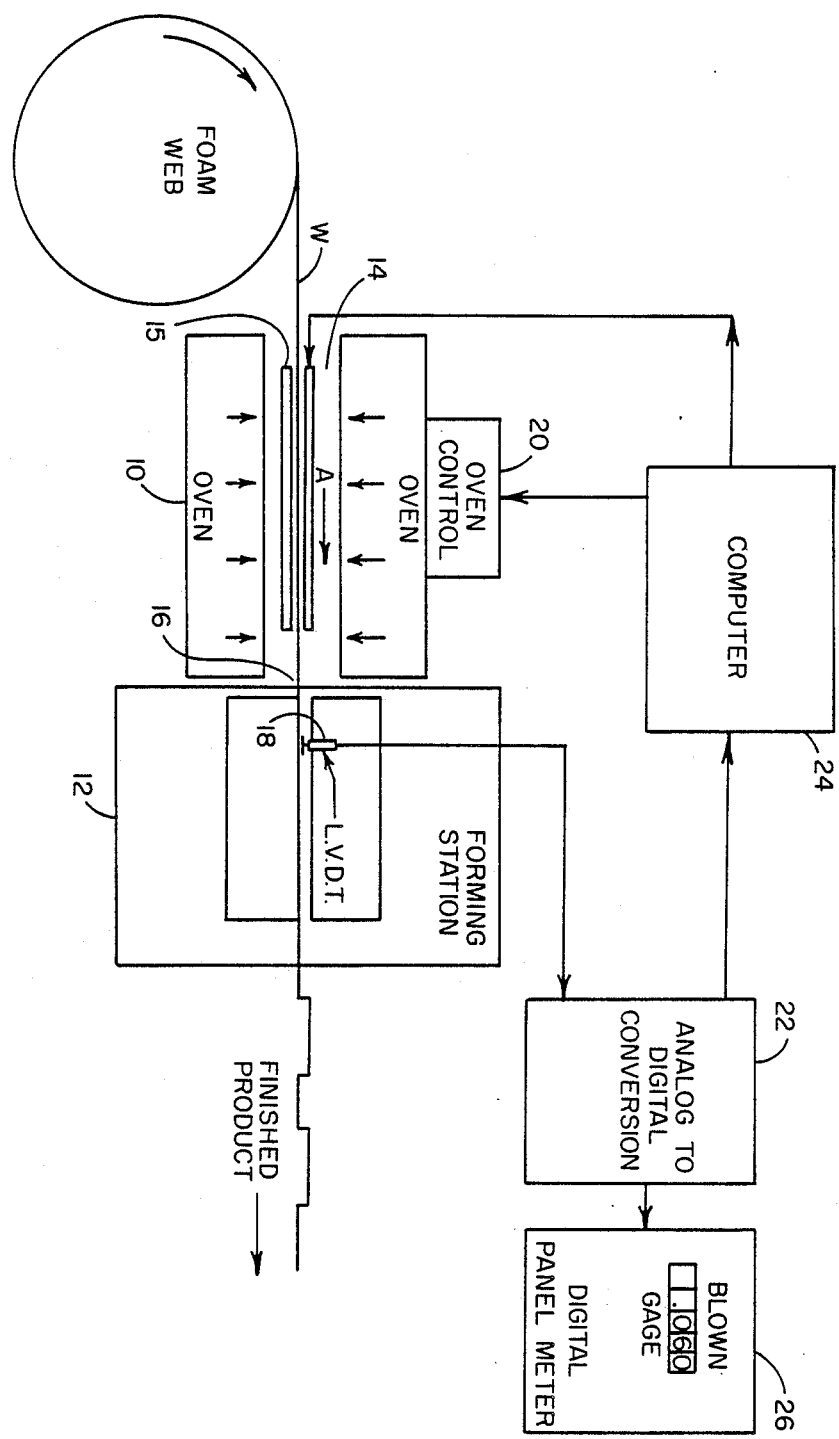

METHOD OF AND APPARATUS FOR MEASURING AND CONTROLLING BLOW-UP OF A FOAM SHEET IN A THERMOFORMER OVEN

CROSS-REFERENCE TO RELATED PATENT APPLICATIONS

This application is a continuation-in-part patent application of Ser. No. 223,981; filed on July 25, 1988.

BACKGROUND OF THE INVENTION

Field of the Invention

The present invention relates to a method and to an apparatus for measuring and controlling blow-up of a foam sheet of a plastic material being heated in a thermoformer oven, and more particularly, controlling the oven operation and/or the advance and dwell of the material in the oven by monitoring the material in the thermoformer oven through sensing the blow-up thereof within the forming station in order to be able to regulate the thickness or blow-up of the plastic material prior to its conveyance into the molding or forming station.

In recent years, molded articles which are constituted of a thermoplastic foam material have gained wide commercial and consumer acceptance due to their economics in manufacture, aesthetic appeal and excellent physical properties. Among such articles are egg cartons, meat and food trays, cups and even larger items, such as boat hulls, refrigerator liners or the like, which are readily molded from a thermoformable plastic material. For instance, it is possible to mass-produce thermoformed articles in an extremely economical manner by heating a continuous sheet of a thermoplastic foam material, for example, foamable polystyrene or similar materials, to a predetermined temperature in a thermoformer oven so that the material is in a thermoplastic state, and from there to convey the heated sheet into a molding station or forming press of a thermoformer, in which the desired thermoformed article configurations are molded into the sheet of the plastic foam material.

In essence, the heating to the molding temperature of the thermoplastic foam material in the thermoformer oven not only plasticizes the material but concurrently therewith expands the foam material such that the thickness of the material may be increased, for instance, up to as much as approximately 1.5 to 2.0 times the original thickness during its conveyance through the oven. Although this phenomenon, known as "sheet blow-up" is essentially three-dimensional in nature, orientation stresses purposely built into the material during extrusion thereof, opposed by the clamping action of the sheet gripping and conveying mechanism in the thermoformer oven, and the continuity of the sheet in the machine direction, result in minimal changes in the sheet length and width during heating of the latter in the thermoformer oven. The increase in the sheet thickness during heating is desirable since it reduces the density of the foam material and allows for the subsequent filling of wider mold gaps at various portions of specific foam plastic articles.

The mold gap in the production tooling, in effect, the void in the mold which is occupied by the product, may vary at different locations throughout the total mold cross-section for various reasons relating to desired final product shape, strength, functional needs, or aesthetics. Thickness of the expanded foam prior to entry into the mold is important since it is desirable to fill all portions of the mold gap throughout the various cross-sections of the mold cavity, and this must be accomplished while counteracting the thinning of the heated material as various portions are stretched and formed into the desired contours of the finished article.

In order to be able to provide molded products in the molding station which evidence a high degree of definition in their conformance with the configurations of the mold, and which provide a consistency and attractive appearance essential to their saleability and utility by a consumer, it is necessary to heat the plastic material to a predetermined temperature in the thermoformer oven and to maintain the material at that temperature to thereby achieve the desired extent of sheet "blow-up" or expansion. Variations in the temperature over the surface of the heated sheet of plastic material as it is conducted from the thermoformer oven into the forming station or molding press of the thermoformer will adversely affect the uniformity in the foam material thickness and, as a consequence, in a like manner the consistency and quality of the thermoformed articles.

Generally, the thermoformable foam plastic sheet is heated by radiant energy heating during its conveyance through the thermoformer oven through the intermediary of a series of heater elements which are usually arranged above and below the path of travel of the material. Such heater elements, which direct the radiant heat against the surfaces of the sheet of plastic material, may be constituted of suitable parabolic heaters, bar heaters, infrared heaters, or ceramic blocks having heating coils therein, which normally extend transverse of the direction of travel of the plastic material sheet through the thermoformer oven, and with the heater elements being energized from an external power source. Additional heater elements may be provided along the edges of the oven to compensate for heat losses to gripping devices which engage the edges of the sheet for transporting the latter through the thermoformer oven. Upon leaving the thermoformer oven, the thus heated thermoplastic sheet is conveyed to a forming station in which it is introduced into a thermoforming press and interposed between the surfaces of a pair of mold members which cooperate to force or mold the heated thermoplastic material into the shape of the thermoformed articles as defined by the contours of the mold surfaces.

DISCUSSION OF THE PRIOR ART

At this time, apparatus and methods have been developed or employed which will measure the blow-up or thickness expansion of a foam plastic material as it is heated in a thermoformer oven. Generally, temperature conditions within the thermoformer oven, which are assumed to be indicative of the temperatures to which the plastic material has been heated and the blow-up thereof, are usually monitored by temperature sensors or thermocouples which measure the temperature of one of the heater elements in each heat zone within the thermoformer oven; of particular importance being the temperature of the material at the discharge end of the thermoformer oven. Any differentials in the monitored or sensed temperatures which deviate from desired temperature levels are read by an operator who will then manually regulate the energy input to various of the heater elements in order to either raise or lower the temperature in those zones of the oven so as to provide and maintain the optionally desired thermoplastic material temperatures and resultant blow-up.

Thus, Holden U.S. Pat. No. 4,438,054, assigned to the common assignee of this invention, measures the thickness of a thermoformable sheet material at a plurality of locations within a thermoformer oven, and thereafter regulates the oven temperature in response to the sensed thickness to maintain the requisite blow-up.

Other publications which are directed to monitoring and/or controlling the thickness or blow-up of a thermoformable material are DiBiasi, et al. U.S. Pat. No. 4,412,961; Burry U.S. Pat. No. 4,376,085; Daubenbuchel, et al. U.S. Pat. No. 4,382,761 and Cisar, et al. U.S. Pat. No. 4,454,082. Moreover, such sensing may be carried out through the utilization of different types of thickness measuring devices, including mechanical feelers or sheet contacting shoes, or electrical and/or thermal sensors, such as LVDT (linear variable differential transformers) as described in Maples U.S. Pat. No. 4,505,158, or sensors such as thermocouples.

Although monitoring or sensing the temperature conditions within the thermoformer oven and controlling the amount of radiant heat generated by the heater elements will, in theory, be an indication of the plastic material temperatures and, as a result, the theoretical "blow-up" or increase in thickness of the material, in actuality considerable deviations have been encountered in the thickness of the foamed material after heating in comparison with the presumed final ideal thickness of the material. These differences between the actual blow-up thickness and the intended or contemplated thickness of the foam plastic material may be occasioned, among other factors, by the cycling on and off of the heaters during normal operation, low or high spot temperatures at various locations within the oven, or varying conditions within the oven, all of which tend to adversely affect the uniformity or extent of heating of the plastic material and, as a result, the extent of blow-up and consistency of any thermoformed articles produced from the non-uniformly heated material, possibly resulting in voids, uneven articles and poor molded definition of the product.

While the actual thickness of the expanded foam material is of particular importance relative to the quality and shape of the resultant thermoformed article, heretofore, no means has been available to routinely monitor this process factor prior to or at the beginning of the molding cycle, but rather within the thermoformer oven. It has also been the practice of the equipment operator to occasionally observe formed product exiting from the production mold either visually or by gauge measurement, and react to heat related product deficiencies via manual adjustments to one or more of the various oven heat zones, without knowing the actual sheet thickness as the sheet enters the forming mold.

In the copending application Ser. No. 223,981; filed 7-25-88, 1988 there is disclosed a method and an apparatus, using an LVDT or the like, which will measure and display the thickness or blow-up in the gauge of the foam material just subsequent to entry into the product forming or article molding section of the thermoforming installation, and in response to the information derived therefrom, automatically regulate the temperature of the thermoformer oven so as to effect desired changes in the thickness or blown gauge of the thermoplastic foam material as it moves along the length of the oven, through a computer and oven temperature control for the operation of the thermoformer oven.

Pursuant to the foregoing, there is specifically provided for the arrangement of at least one sensor within the thermoformer product forming or molding station which measures the "blow-up" or thickness of the heat-expanded foam sheet material which is received from the thermoformer oven. The sensor is connected to an oven temperature control arranged through the interposition of an analog-to-digital converter converting the LVDT signals into electrical signals transmitted to a computer, such as a microprocessor, for conducting temperature-regulating commands to the oven control. Also connected to the analog-to-digital converter is a digital panel meter which affords visual readouts of the measured foam sheet thickness in the forming station to an operator. The oven control, in turn, is connected to the heater elements of the oven so that, when the thickness or "blow-up" which has been sensed in the forming station deviates from a desired thickness for the foam plastic material which is being heated during its passage through the thermoformer oven, in response to commands from the computer, it is possible to automatically vary the energy or power input to the heater elements in a specific zone or zones of the oven so as to either increase or decrease the heat radiating against the sheet of plastic material. This will, in a simple and advantageous manner, permit control over the oven operation so as to achieve a more precise and uniformly distributed heating and heat expansion or blow-up of the plastic material upon the discharge thereof to and receipt by the thermoforming station or molding press.

Pursuant to a specific aspect of the apparatus, the foam material thickness sensor in the forming station may comprise a LVDT (linear variable differential transformer) and which is connected to an oven temperature control system through the analog-to-digital converter and computer for automatically regulating the oven temperature.

SUMMARY OF THE INVENTION

Although the foregoing method and apparatus affords a clear and significant advance and improvement over the current state-of-the-art, it may at times be desirable, rather than controlling the thermoformer oven temperature in order to regulate the sheet blow-up, to vary or adjust the rate of advance or dwell of the material within the thermoformer oven. This alternative solution to the problem is regulating the precision in the blow-up of the plastic sheet material entering the thermoforming or molding station enables a more rapid control than by merely regulating the oven temperature, and affords an enhanced degree of precision in regulating the blow-up of the material within the thermoforming station.

Accordingly, it is a primary object of the present invention to provide a method for the measurement of the actual thickness of a sheet of a thermoformable foam plastic material heated in a thermoformer oven as it is conducted into a forming station of a thermoformer.

Another object of the invention resides in the provision of a method for measuring the actual sheet thickness at least at one location within a forming station of a thermoformer.

A further object of the invention provides a method and apparatus for varying the speed of advance through or the dwell of the plastic sheet material in the thermoformer oven in response to the actual thickness or blowup measured on the sheet in the forming station so as to enable to automatically produce the desired blow-up thickness for the sheet entering the forming station.

Yet another object of the invention is to provide a method and apparatus of the type as described herein in which, in addition to regulating the speed of advance or dwell of the sheet of plastic material within the thermoformer oven, there is concurrently implemented a control over the oven temperature conditions so as to be able to optimize the controllability over the blow-up of the sheet thickness being conveyed into the thermoforming station.

In summation, the primary benefit of the novel foam material blow-up measuring method and thickness measuring apparatus pursuant to the invention, and for automatically regulating the advance of the material or dwell thereof within the thermoformer oven, resides in the provision of a more consistently and uniformly heated thermoformable foam material resulting in an improved thermoformed product blow-up or gauge consistency. The concept of the invention in obtaining accurate control over the blow-up of the material in thermoformer oven is based upon:

(1) Utilization of a foam material thickness sensing device for reading of the actual sheet thickness at least at one location within the forming station;

(2) Varying the rate of advance or dwell of the sheet material in the thermoformer oven based on the sensor information obtained in the forming station in order to obtain an optimum foam material blow-up prior to the thermoforming operation.

(3) Optionally, in conjunction with (2), varying the energy supplied to the heater elements of the thermoformer oven so as to maintain the sheet temperatures at desired levels within the oven for predetermined dwell periods so as to optimize the blow-up of the material.

BRIEF DESCRIPTION OF THE DRAWING

Reference may now be had to the following detailed description of an exemplary embodiment of an apparatus for controlling thermoformer oven operation, such as rate of advance or dwell of the material therein, and possibly concurrently regulating th;e oven temperature; in response to actual foam material blow-up which is sensed in a sheet of thermoformable plastic film being conducted into the forming station of a thermoformer; taken in conjunction with the accompanying single drawing figure illustrating a schematic representation of a thermoforming installation incorporating the thermoformer oven controlling apparatus pursuant to the invention.

DETAILED DESCRIPTION

Referring now in detail to the single figure of drawing, schematically illustrating a thermoforming installation pursuant to the invention, the installation includes a thermoformer oven 10 which communicates at its outlet or discharge end with a forming station 12 comprising a mold or thermoforming press. In the illustrated embodiment, a sheet W of a thermoformable foam plastic material is supplied from a supply roll or other suitable supply source into the infeed end 14 of the thermoformer oven 10. Within the thermoformer oven 10 the sheet of plastic material W is transported by means of suitable edge gripping devices 15, which are actuated by a driving arrangement (not shown) in the direction of arrow A towards the discharge end 16 of the oven which, in general, is contiguous with or closely adjoins the inlet end of the forming station 12.

Usually, as is well known in the technology, the interior of the thermoformer oven 10 is typically radiantly heated through a series of heater elements normally extending transverse to the direction of travel of the plastic material sheet W both above and below the plane of travel of the web. For example, the heater elements may consist of a plurality of heating rods extending from side to side of the thermoformer oven, and may have an arcuate reflector positioned behind each of the heater elements in order to radiate the generated heat towards the surfaces of the plastic material sheet W so as to heat the latter, and cause it to blow-up to a certain gauge. Additional heater rods or elements, as known, may be provided along the side edges of the oven along the direction of the travel of the sheet W therethrough in order to compensate for heating losses caused by the edge gripping devices. The utilization of heater rod elements is merely referred to as being exemplary, other suitable heating devices, such as heater plates, infrared heating devices, ceramic plates with inserted heating coils and the like also being applicable to provide the necessary heating of the sheet.

The temperature of the heater elements within the thermoformer oven 10 is maintained at a predetermined level through suitable control over the energy supply to the heater elements so as to heat the plastic material sheet W to a predetermined consistent temperature level at the discharge end 16 prior to the discharge or conveyance of the sheet from the thermoformer oven into the forming station 12.

Positioned at least at one location within the forming station 12, preferably proximate the sheet inlet end thereof, is a material thickness sensing device 18, as described hereinbelow, which is adapted to measure the actual sheet gauge thickness or blow-up while the sheet is conveyed therepast through the forming station 12.

This thickness sensing device 18 may comprise a LVDT (linear variable differential transformer) extending vertically into the forming station into close proximity or contact with the surface of the web W.

This thickness sensing device or LVDT 18 is connected in a closed system with the drive for the edge gripping devices 15 in the thermoformer oven 10 through the interposition of an analog-to-digital converter 22 which receives a signal from the LVDT regarding the gauge or blow-up of the sheet W entering the forming station 12, and which, in turn, is connected to a computer 24, such as a microprocessor, to convey command signals, automatically regulating the advancing speed of the edge gripping 15 so as to vary the rate of the advance or dwelling time of the sheet material W within the oven in conformance with the LVDT sensing, thereby controllably adjusting the extent of foam material blow-up and resultant gauge. In addition thereto, the computer 24 is also connected to an oven temperature controller 20, and is adapted to, if desired, regulate the temperature within the oven 10 concurrently with regulating the advance of the edge gripping devices 15. This will optimize the degree of control over the variation and speed in the blow-up rate of the sheet W within the thermoformer oven 10 in response to the gauge measured by the sensing device 18 in the forming station 12. The analog-to-digital converter 22 is also connected to a visual digital display meter or readout panel 26, indicative of the gauge thickness or blowup of the sheet W at the sensed location within the forming station.

Although the speed of advance for the edge gripping device 15 and operation of the oven temperature controller 20 are described as being automatically controlled by microprocessor 24, it may be possible to effect manual control over the sheet blow-up in the thermoformer oven, such as by an operator reading the information on the panel or meter 26 received from the LVDT 18 in the forming station 12.

While there has been shown and described what is considered to be a preferred embodiment of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A method of measuring and controlling foam plastic sheet blow-up by regulating advancement rate of a continuous thermoformable foam plastic material sheet through a thermoformer oven responsive thickness measurements of said sheet of plastic material which is conveyed through said thermoformer oven towards a thermoforming installation; comprising:
   (a) sensing the sheet thickness of thermoformable material at least at one location within a forming station of said thermoforming installation;
   (b) and varying the rate of advance of said sheet material within said thermoformer oven so as to regulate dwelling time thereof in said oven in response to variations in the sheet thickness sensed in said forming station to thereby obtain a requisite blow-up of the material received in the forming station from said oven.

2. A method as claimed in claim 1, comprising sensing the sheet thickness by positioning an LVDT (linear variable differential transformer) at said location within said forming station.

3. A method as claimed in claim 1, comprising determining the blow-up of said material proximate inlet end for said sheet in the forming station.

4. A method as claimed in claim 1, comprising varying temperature in the thermoformer oven concurrently with varying the rate of advance of said material responsive to the sensed blow-up of said foam material in said forming station to maintain material temperatures within predetermined temperature ranges within said oven.

5. A method as claimed in claim 1, comprising a microprocessor for automatically varying the rate of advance of said sheet through said thermoformer oven responsive to the measured blow-up of said material in said forming station.

6. An apparatus for measuring and controlling foam plastic material blow-up to regulate advancement rate of a continuous thermoformable foam plastic material sheet through a thermoformer oven responsive a thickness measurements of said sheet of thermoformable plastic material which is conveyed through said thermoformer oven towards a thermoforming installation; comprising:
   (a) thickness sensor means in a forming station of said thermoformer oven; said sensor means including an element extending towards said sheet and being adapted to measure the blow-up of said sheet;
   (b) and means for varying the rate of advance of said sheet material within said thermoformer oven so as to control dwelling time thereof in said oven based on variations in the sheet blow-up measured in said forming station and to resulting control the extent of material blow-up of the sheet entering the forming station.

7. An apparatus is claimed in claim 9, said sensor means comprising a LVDT (linear variable differential transformer).

8. An apparatus as claimed in claim 6, comprising an oven controller, said thickness sensor means being connected to said controller through a microprocessor for automatically controlling the operation of said controller in response to signals received from said thickness sensor means, and said controller including means for controlling said means for varying the rate of advance of said sheet material through said oven.

9. An apparatus as claimed in claim 8, wherein said oven controller regulates temperature in said thermoformer oven concurrently with regulating the rate of advance of said sheet material for optimizing the control over the blowup of said material entering the forming station 10. An apparatus as claimed in claim 8, comprising analog-to-digital converter means being connected intermediate said thickness sensing means and said microprocessor; and means for providing a digital display of thickness information being connected to said analog-to-digital converter means.

* * * * *